United States Patent [19]
Gilpin et al.

[11] Patent Number: 5,401,592
[45] Date of Patent: Mar. 28, 1995

[54] PRIMARY AND SECONDARY LATCHING SYSTEM FOR SECURING AND PROTECTING A REPLACEABLE PORTABLE BATTERY PACK

[75] Inventors: David Gilpin, Everett; Steven Bunce, Mill Creek, both of Wash.

[73] Assignee: Intermec Corporation, Everett, Wash.

[21] Appl. No.: 150,486

[22] Filed: Nov. 10, 1993

[51] Int. Cl.[6] .............................................. H01M 2/10
[52] U.S. Cl. ...................................... 429/97; 429/123; 429/50
[58] Field of Search ................................. 429/96–100, 429/123, 50; 361/380, 391, 394; 307/150; 364/708

[56] References Cited

U.S. PATENT DOCUMENTS

| | | | |
|---|---|---|---|
| 3,999,110 | 12/1976 | Ramstrom et al. | 320/2 |
| 4,632,201 | 12/1986 | Kay | 180/68.5 |
| 5,148,042 | 9/1992 | Nakazoe | 307/65 |
| 5,213,913 | 5/1993 | Anthony, III et al. | 429/97 |
| 5,220,520 | 6/1993 | Kessoku | 364/708 |
| 5,225,293 | 7/1993 | Mitchell et al. | 429/97 |
| 5,244,755 | 9/1993 | Benoist et al. | 429/97 |

Primary Examiner—Anthony Skapars
Attorney, Agent, or Firm—Seed and Berry

[57] ABSTRACT

A latching system for a battery pack of a hand-held, portable electronic device. A primary latch on the front panel of the battery pack releasably engages a retaining shoulder portion within a battery housing to removably secure the battery pack in a fully installed, electrically connected position within the electronic device. Secondary latches are connected to the left and right side panels of the battery pack at a position away from the primary latch. Each secondary latch is adapted to releasably engage a secondary retaining shoulder within the housing to retain the battery pack in a partially removed position. Elongated electrical contacts are connected to the battery pack and provide electrical contact between the battery pack and the electronic as battery pack is moved from the installed position to the partially removed position. A switch coupled to the battery pack detects movement of the battery pack from the installed position. The primary and secondary latches each have an outwardly biased lever arm movably connected to the battery pack and a head member connected to the lever arm. The primary and secondary latches are arranged so the secondary latches are inaccessible until the battery pack is moved to the partially removed position.

28 Claims, 4 Drawing Sheets

PRIMARY AND SECONDARY LATCHING SYSTEM FOR SECURING AND PROTECTING A REPLACEABLE PORTABLE BATTERY PACK

TECHNICAL FIELD

The present invention relates to latch mechanisms, and more particularly to latch mechanisms for removable battery packs used with portable electronic devices.

BACKGROUND OF THE INVENTION

Many portable, hand-held electronic devices are powered by removable and rechargeable battery packs. The battery packs are typically secured in an operable position by a single latching mechanism or by a door assembly that covers and encloses the battery pack. For example, U.S. Pat. No. 3,999,110 discloses a battery pack and latch assembly for use with cordless power tools wherein a single, biased battery latch retains the battery pack and provides a quick disconnect feature that allows a user to remove and replace the rechargeable battery in a very fast and time efficient manner.

As seen in U.S. Pat. No. 5,220,520, battery powered, hand-held computers and bar code scanners also use quick disconnect, single latch systems to retain replaceable, rechargeable battery packs. As such, a user can quickly disconnect and remove the battery and replace it with a fresh battery. These battery retention systems reduce down time of the device while changing batteries.

The drawback to the single latch, battery retention system is the battery pack can be quickly disconnected from the hand-held computer. When the battery pack is suddenly removed from the computer, power to the device is instantly terminated and data stored in the computer's open data directories can be lost, because power to properly close the device's memory storage mechanism is not available. Thus, while the single latch arrangement allows for the quick removal of the power source, it does not give the computer enough time to properly store data captured therein as it shuts down.

A further drawback of the single latch battery retention system is the absence of a backup latching system. When the single latching system fails or is inadvertently released, the battery pack can fall out of the electronic device and be damaged. The inadvertent removal of the battery pack can also cause a sudden and improper shut-down of the device and a loss of data.

Therefore, there is a need for a battery pack latching system that avoids the problems resulting from sudden termination of electrical power to a computer or scanner. In addition, there is a need to avoid inadvertent removal of a battery pack and the resulting damage to the battery pack and loss of data.

SUMMARY OF THE INVENTION

The present invention solves the above and other problems experienced by the prior art by using a primary and secondary latching system that removably secures a replaceable, portable battery pack within a battery housing of a hand-held electronic device. In a preferred embodiment, the primary and secondary latching system has a primary latch connected to one portion of a battery case and adapted to secure the battery case in an installed, operable position. At least one secondary latch is connected to the battery case at a position remote from the primary latch and is adapted to removably secure the battery case in a partially removed position without loss of electrical contact between the battery and the device. The secondary latch is positioned and oriented on the battery case so the primary and secondary latches must be released sequentially and can not be released simultaneously to fully remove the battery case from the device.

In the preferred embodiment of the invention, the primary latch is a dog member movably connected to a front portion of the battery case and adapted to releasably engage a retaining shoulder within a battery case housing of a portable electronic device. Two secondary latches are provided wherein each secondary latch is a dog member movably connected to opposite side portions of the battery case that are substantially perpendicular to the front portion of the battery case. The secondary latches are positioned so they are not accessible to a user when the battery case is in the installed position, and they can only be released when the battery case is moved to the partially removed position.

The secondary latches each include dog members adapted to releasably engage a retaining shoulder within a battery case housing of the device so the battery case removably disposed within the housing is blocked from moving beyond the partially removed position until the secondary dog members are released. Primary and secondary release portions are coupled to the primary and secondary latches and are adapted to move the latches between an engaged position and a released position, thereby releasing the battery case from the housing. The primary and secondary release portions are identified by user engageable members, such as buttons.

A switch mechanism is coupled to the battery case, and the switch mechanism detects movement of the battery case away from the installed position. Upon detecting the movement of the battery case, the switch mechanism is activated and provides a signal to the electronic device, which begins an orderly shut-down procedure to properly save data before the battery case is removed from the partially removed position and power is removed from the electronic device.

Thus, the primary securing mechanism retains the battery case within the electronic device in a fully installed, operable condition. The secondary securing mechanisms retain the battery case in a partially removed position whereat electrical connection is maintained between the electronic device and the battery case so data can be properly stored before full removal of the battery case and termination of the electrical connection. The secondary securing mechanisms also are positioned so removal of the battery pack requires an additional step after activating the primary securing mechanism before power to the device can be terminated, thereby giving the device enough time to perform the orderly shut-down procedure and properly save data being processed within the device.

The present invention also provides a method of removing a battery pack assembly installed in a housing of a hand-held electronic device. A primary latch is moved from an engaged position to a released position so the primary latch is disengaged from the housing, and the battery pack is moved from a first position, such as an installed position, to a second position, such as a partially removed position, while maintaining electrical connection between the battery pack and the electronic device. The switch mechanism detects movement of the battery pack away from the installed position and provides a signal to the electronic device to initiate an orderly shut-down procedure. At least one secondary latch prevents the battery pack from moving beyond the second position. The secondary latch is moved from an engaged position to a released position to disengage the secondary latch from the housing, and allow removal of the battery pack from the housing and terminate the electrical connection between the battery pack and the electronic device.

DETAILED DESCRIPTION OF THE INVENTION

Figure 1:
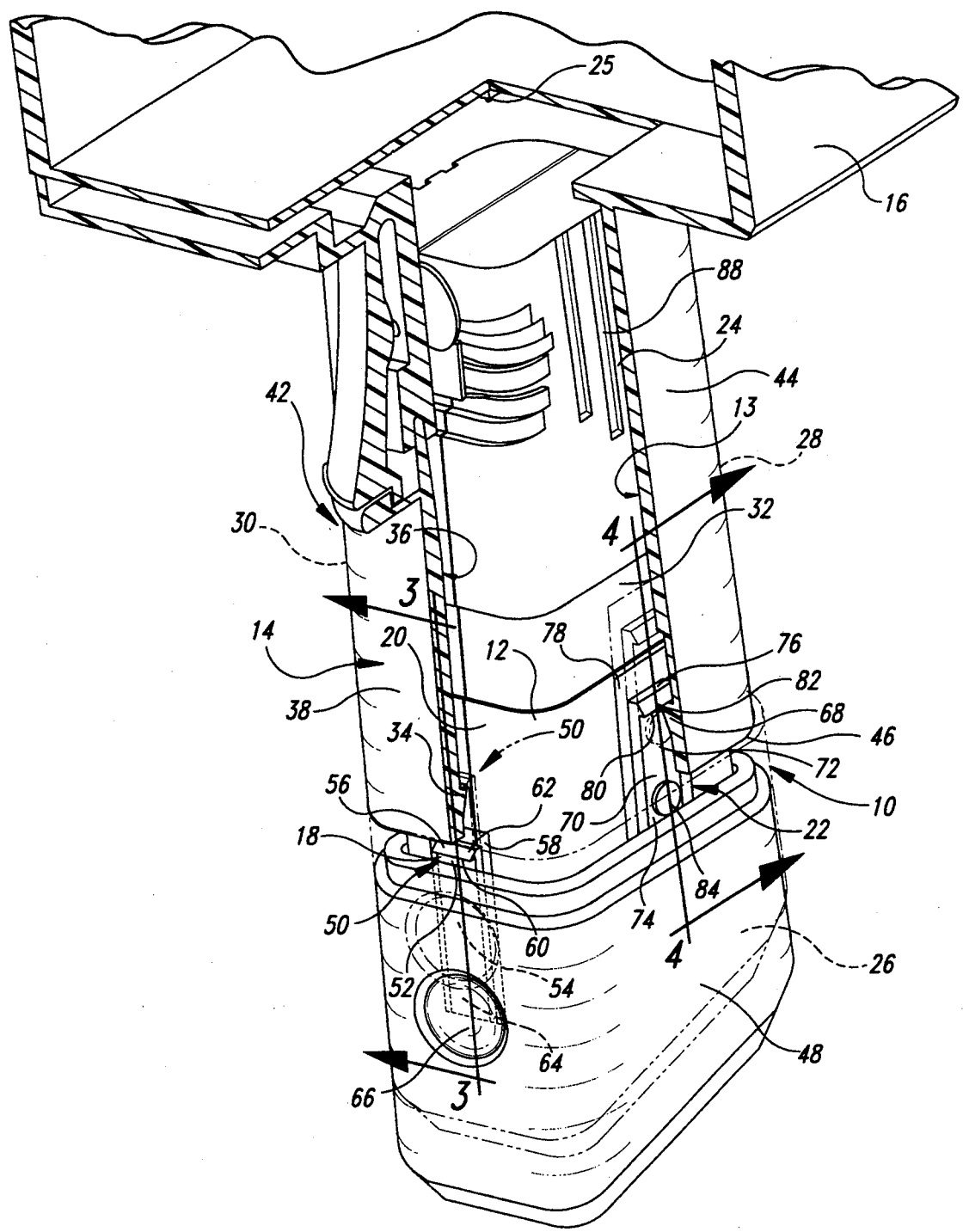
FIG. 1 is a fragmentary, front isometric view of a hand-held bar code reader using battery pack latching assembly in accordance with the present invention to retain a battery case in a partially removed position.

The present invention will be more clearly understood from the following detailed description of a preferred embodiment of the invention taken in conjunction with the attached drawings. As seen in FIG. 1, a latching system 10 in accordance with the present invention is incorporated into a battery pack 12 that slidably fits into an interior chamber 13 of a handle 14 or other suitable battery housing of a hand-held, electronic device 16, such as a computer or bar code scanner.

The latching system 10 has a primary latch 18 connected to a front sidewall 20 of the battery pack 12. The primary latch 18 releasably engages the handle 14 and secures the battery pack 12 within the handle interior chamber 13 in a fully installed position, as shown in phantom in FIG. 1. A secondary latch 22 is connected to each of the left and right sides of the battery pack 12 at a position longitudinally remote from the primary latch 18. The secondary latch 22 releasably engages the handle 14 and blocks the battery pack from moving beyond a partially removed position, as shown in solid line in FIG. 1.

A switch 25 connected to the electronic device 16 is coupled to the battery pack 12 when the battery pack is in the fully installed position. The switch 25 detects when the battery pack 12 is moved out of the fully installed position and provides a signal to the electronic device that initiates an orderly shut-down procedure that identifies and saves data temporarily stored in a memory storage mechanism of the electronic device. In an alternative embodiment, the switch can be coupled to the primary latch 18 and adapted to detect movement of the latch as it is being disengaged or released from the handle and to provide a signal to the electronic device to initiate the orderly shut-down procedure.

The primary and secondary latches 18 and 22 are positioned and oriented on the battery pack 12 so they must be released sequentially. In the preferred embodiment, two secondary latches 22 are attached to the battery pack 12 on opposite left and right sides thereof and the secondary latches are not accessible to a user when the battery pack is in the installed position. In addition, the secondary latches 22 are positioned so a user must re-orient his or her hand after releasing the primary latch 18 in order to engage and release the secondary latches. This orientation of the primary and secondary latches 18 and 22 prevents a user from removing the battery pack and disconnecting the power supply to the scanner 16 before data in the scanner can be properly saved.

As best seen in FIG. 1, the battery pack 12 is a substantially rectangular column shaped and sized so an upper portion 24 of the battery pack can slide within the handle interior chamber 13, while a lower portion 26 of the battery pack remains outside of the handle interior chamber and is accessible to a user. The battery pack 12 further has a left sidewall 30 and a right sidewall 32 connected to the front sidewall 20 and to a rear sidewall 28 to form the rectangular column. The handle interior chamber 13 is formed by a front panel 38 that communicates with the front sidewall 20 of the battery pack 12, left and right side panels 42 and 44 that communicate with the left and right sidewalls 30 and 32 of the battery pack, and a rear panel (not shown) that communicates with the rear sidewall 28 of the battery pack. A primary retaining shoulder 34 is mounted on an inside surface 36 of the front panel 38 of the handle, and a secondary retaining shoulder 68 is mounted on an inside surface 69 on each of the left and right side panels 42 and 44. Although the preferred embodiment uses retaining shoulders, other suitable detents can be used.

The primary latch 18 is positioned at the front sidewall 20 of the battery pack 12 to releasably engage the primary retaining shoulder 34 when the battery pack 12 is in the fully installed position to lock the battery pack in this position within the handle interior chamber 13. In this installed position, the lower portion 26 of the battery pack 12 extends below a bottom edge 46 of the handle 14 and the upper portion 24 is disposed within the handle interior chamber 13 in electrical engagement with the electronic device 16. In the preferred embodiment, a battery boot 48 which is described in U.S. patent application titled SHOCK MITIGATING BATTERY BOOT filed concurrently herewith and incorporated herein by reference, encases the lower portion 26 of the battery pack 12 and abuts against the bottom edge 46 of the handle 14 when the battery pack is in the fully installed position. The boot 48 does not interfere with operation of the primary or secondary latches.

Figure 2:
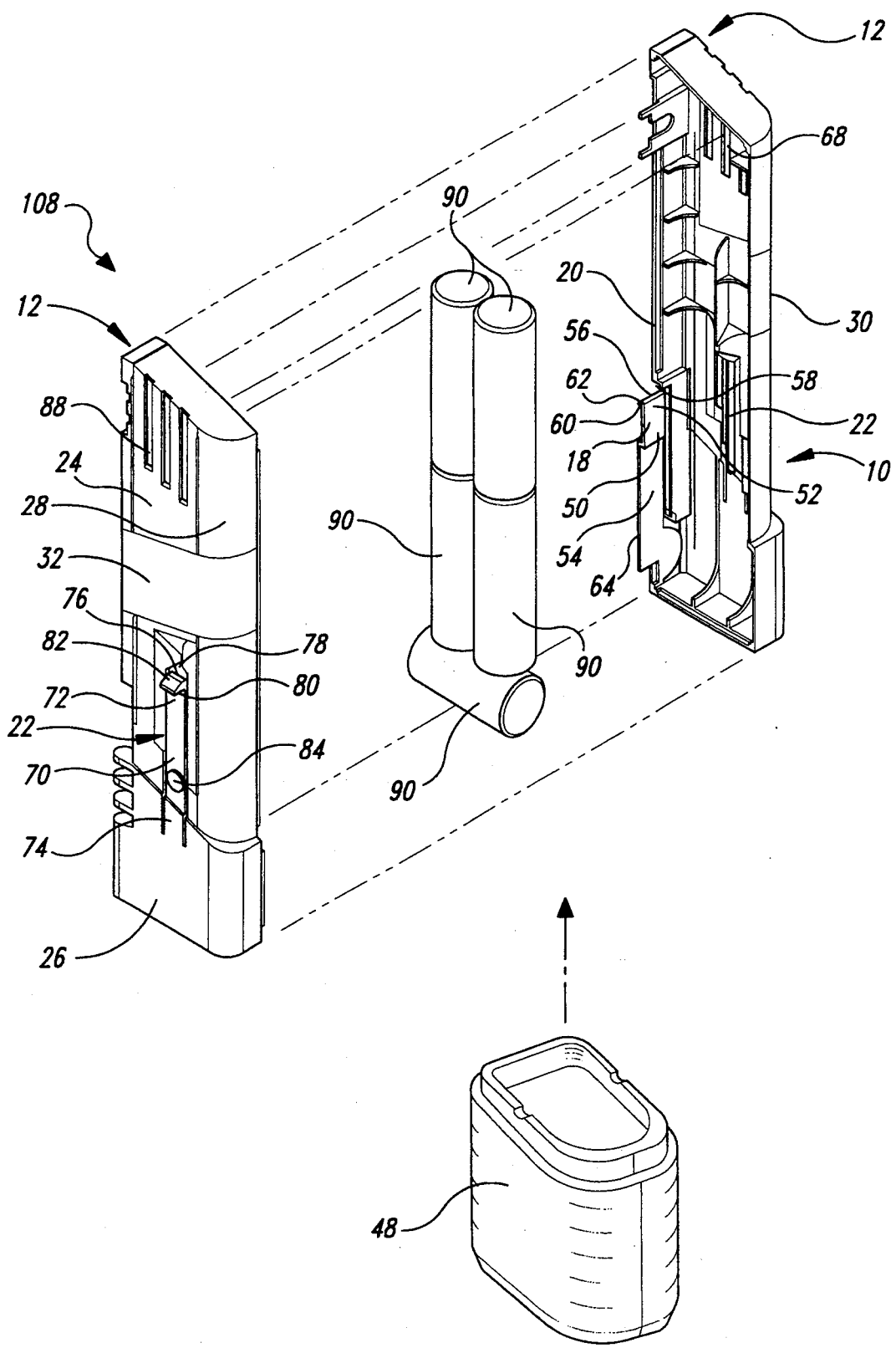
FIG. 2 is a reduced, exploded rear isometric view of the battery pack having the latching assembly of FIG. 1.
Figure 3:
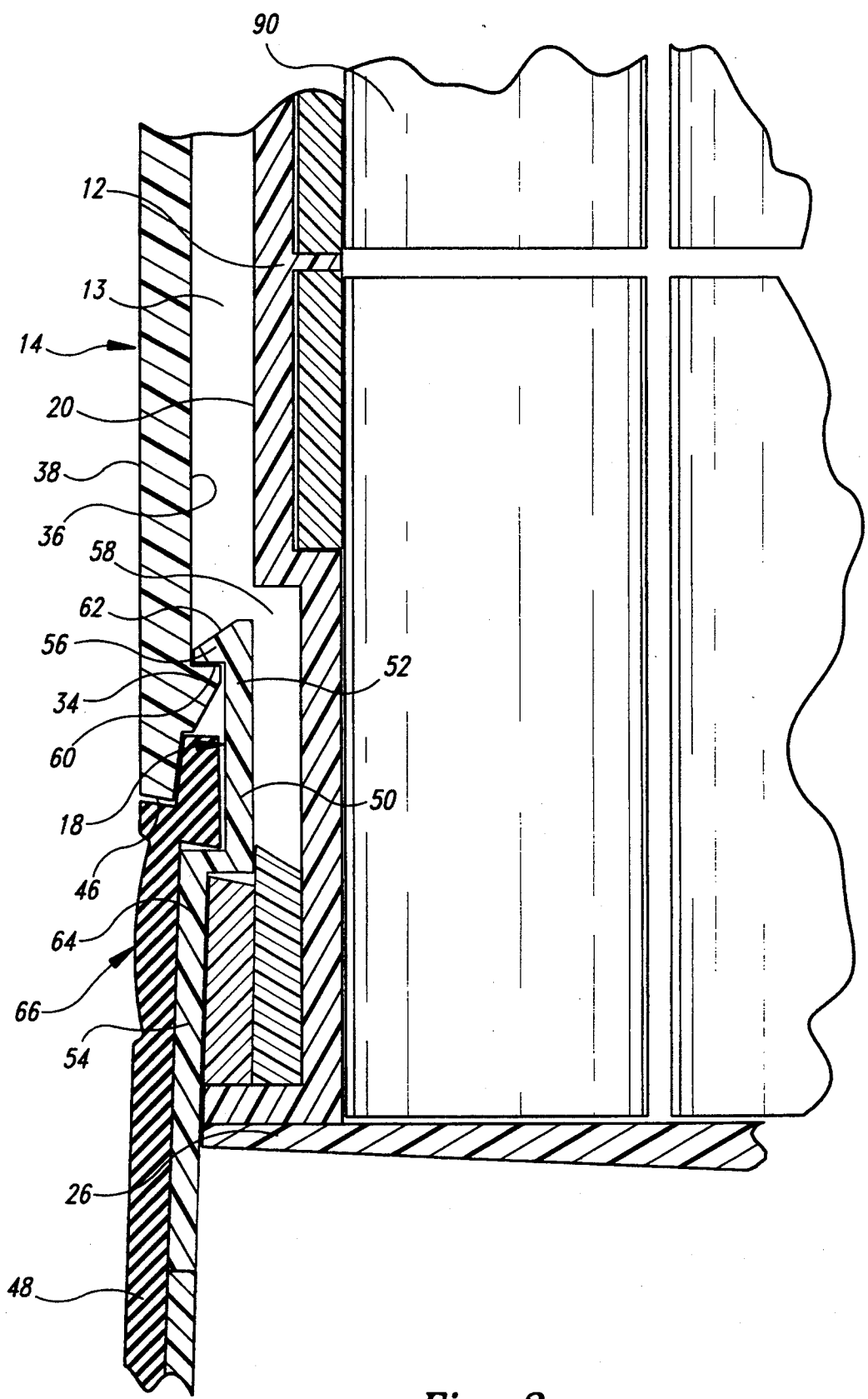
FIG. 3 is an enlarged cross-sectional view taken substantially along line 3—3 of FIG. 1.

As best seen in FIGS. 1, 2, and 3, the primary latch 18 is a flexible dog member having a vertically oriented resilient lever arm 50 with a laterally inward sloping head 56 connected to a top 52 of the lever arm. The lever arm 50 is movably connected at a bottom 54 thereof to the front sidewall 20 of the battery pack 12 so the bottom of the lever arm is below the handle 14 when the battery pack is in the fully installed position. In addition, the head 56 of the primary latch 18 is disposed within the handle interior chamber 13 in releasable engagement with the primary retaining shoulder 34.

The lever arm 50 of the primary latch 18 extends vertically and substantially parallel to, but is spaced outward from, the front sidewall 20 of the battery pack 12. The primary latch 18 is disposed within a recessed area 58 in the battery pack 12 so an area is provided behind the lever arm 50 between the front sidewall 20 of the battery pack and the lever arm 50 and head 56 of the primary latch. The recessed area 58 allows the primary latch 18 to be bent from an engaged position, wherein the lever arm 50 and head 56 are positioned away from the front sidewall 20, to a released position, wherein the lever arm and head will be immediately adjacent to or contacting the front sidewall 20 and disengaged from the primary retaining shoulder 34. Thereafter, the battery pack 12 can be slid out of the fully installed position toward the partially removed position. The primary latch 18 is biased away from the front sidewall 20 to the engaged position. Accordingly, the primary latch 18 will snap into engagement with the primary retaining shoulder 34 when the battery pack 12 is pushed into the handle interior chamber 13 to the installed position.

In the preferred embodiment, the primary latch 18 is a plastic, molded component that is formed integral with the front sidewall 20 of the battery pack 12. The inwardly sloping head 56 of the primary latch 18 has a sloped engaging face 60 that extends outward from the lever arm 50 and forms the bottom of the head that abuts the primary retaining shoulder 34. The top of the head 56 has a forwardly, downward sloping face 62 that is adapted to slidably engage the primary retaining shoulder 34 and to displace the head inward toward the front sidewall 20 as the head is pushed over the primary retaining shoulder upon movement of the battery pack toward the installed position. When the battery pack 12 is in the fully installed position and the head 56 is above the primary retaining shoulder 34, the primary latch 18 snaps into the engaging position. Accordingly, the engaging face 60 of the head 56 securely engages the primary retaining shoulder 34 and releasably holds the battery pack 12 in the fully installed position within the handle interior chamber 13.

The primary latch 18 can be released from this engaged position by depressing a release portion 64 connected to the lever arm 50. The release portion 64 is located on the bottom portion of the lever arm so it is below the bottom edge 46 of the handle 14 and is accessible to a user when battery pack 12 is in the fully installed position. The release portion 64 is adapted to be depressed by a user and to bend the lever arm 50 from the engaged position to the released position. The release portion 64 is covered by the flexible battery boot 48 that has an integrally formed button 66 on the front portion of the boot. The button 66 is positioned adjacent to the release position 64 to identify to a user the location of the release portion. The battery boot 48 is sufficiently flexible so the release portion 64 can be depressed to bend the lever arm 50 when a user presses on the button 66 on the battery boot.

Figure 4:
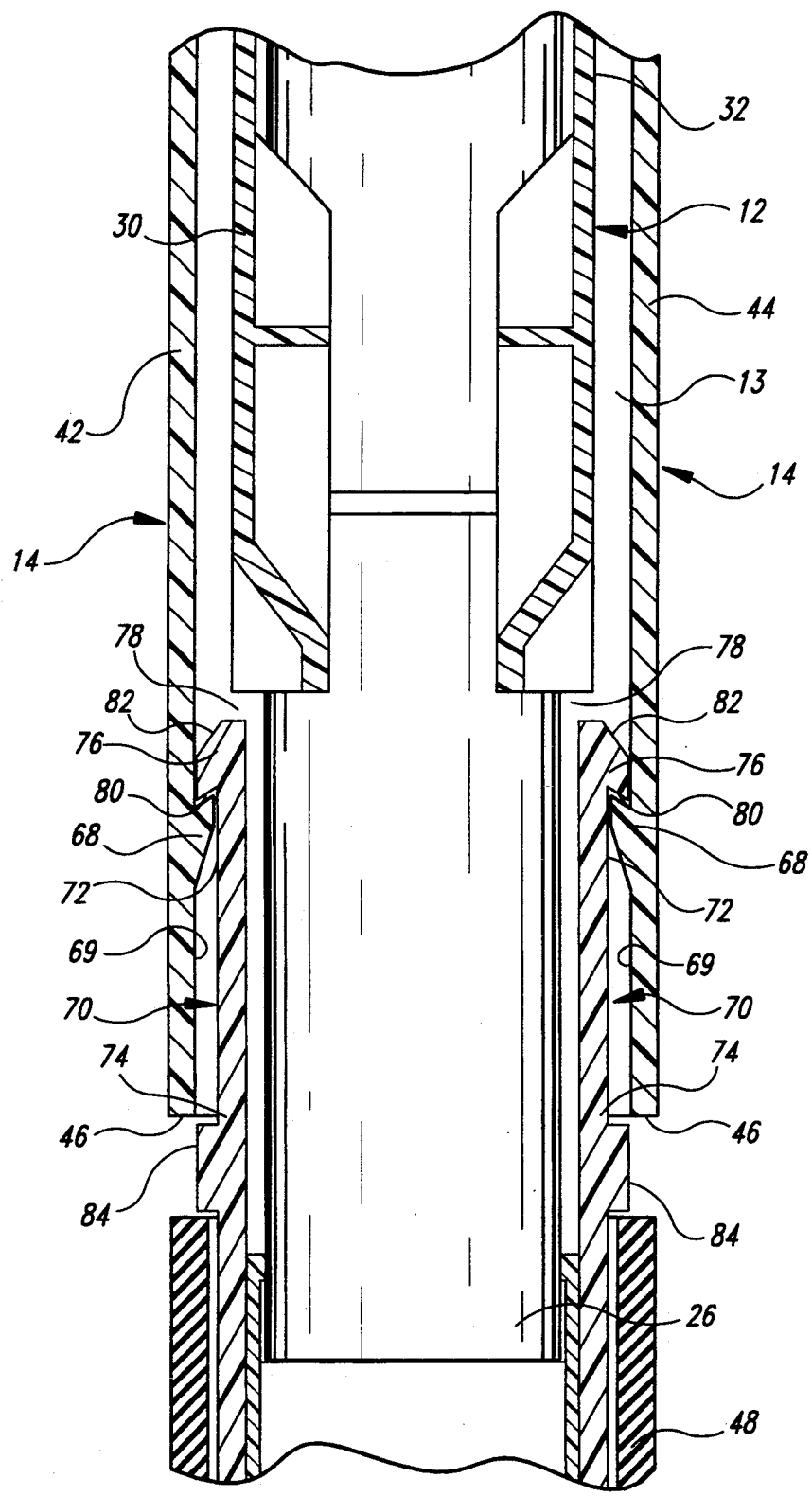
FIG. 4 is an enlarged cross-sectional view taken substantially along line 4—4 of FIG. 1.

Referring to FIGS. 1, 2 and 4, a secondary latch 22 is connected to each of the left and right side portions 30 and 32 of the battery pack 12. Each secondary latch 22 is adapted to releasably engage the secondary retaining shoulder 68 on the inside surface 69 of the left or right side panels 42 and 44 of the handle 14 when the battery pack 12 is in the partially removed position. The secondary latches 22 allow the battery pack 12 to freely slide between the installed position once the primary latch 18 is released and the partially removed position. Thus, the secondary latches 22 act to block the battery pack 12 from sliding out of the handle interior chamber 13 beyond the partially removed position when the primary latch 18 is released, either advertently or inadvertently.

For purposes of clarity, only one secondary latch 22 will be described in detail below and it is to be understood that the description applies to both of the secondary latches of the battery pack 12. The secondary latch 22 of the preferred embodiment is a dog member having a lever arm 70 with a laterally inwardly sloping head portion 76 connected to a top 72 of the lever arm. One lever arm 70 movably connects at a bottom 74 thereof to each of the left and right sidewalls 30 and 32 of the battery pack 12 slightly above the battery boot 48. As such, the lever arm 70 of the secondary latch 22 is completely disposed within the handle 14 and not accessible to the user when the battery pack 12 is in the fully installed position. The lever arm 70 extends vertically upward substantially parallel to the sidewall of the battery pack 12. The length of the lever arm 70 is such that the head 76 is positioned closer to the upper portion 24 of the battery pack 12 than the head 56 of the primary latch 18.

The head 76 of the secondary latch 22 is adapted to releasably engage the secondary retaining shoulder 68 attached to the inside surface 69 of the left or right sidewall 30 or 32 of the handle 14. The secondary retaining shoulder 68 is positioned at approximately the same vertical distance from the bottom edge 46 of the handle 14 as the primary retaining shoulder 34 discussed above. Accordingly, the head 76 and the top 72 of the lever arm 70 extend above the secondary retaining shoulder 68 and do not engage it when the battery pack 12 is in the installed position. After the primary latch 18 has been disengaged, the switch 25 activated, and the battery pack 12 slid downward to the partially removed position, as best seen in FIG. 1, the head portion 76 releasably engages the secondary retaining shoulder 68.

In the preferred embodiment, each secondary latch 22 is a plastic, molded component that is formed integral with each of the sidewalls 30 and 32 the battery pack 12. In addition, each of the secondary latches 22 is disposed within a cutout area 78 in one of the sidewalls 30 or 32 of the battery pack 12, as best seen in FIGS. 2 and 4. The cutout area 78 is shaped and sized to allow the secondary latch 22 to be bent between an outward, engaged position, wherein the head 76 is at an outermost location from the battery pack 12 and it will engage the secondary retaining shoulder 68, and a released position, wherein the head is spaced inward away from and not engaged with the secondary retaining shoulder. The secondary latch 22 is biased to the engaged position so it will snap into the engaged position when pushed over and beyond the secondary retaining shoulder 68 during installation of the battery pack 12.

The head 76 of the secondary latch 22, similar to the primary latch 18, has a substantially flat or inwardly downward sloping engaging face 80 that extends outwardly from the lever arm 70 and forms the bottom of the head, and is adapted to releasably contact the secondary retaining shoulder 68 when the battery pack 12 is in the partially removed position. The top of the head 76 has a outwardly downward sloping face 82 that is adapted to bend the secondary latch 22 into the cutout area 78 as the head 76 passes over the secondary retaining shoulder 68 when the battery pack is inserted into the handle interior chamber 13.

The secondary latch 22 can be released from the engaged position with a release portion 84, such as a button, that is connected to the bottom 74 of the lever arm 70. The release portion 84 is positioned on the bottom 74 of the shaft 70 so it is only visible and accessible to a user after the battery pack 12 has been moved to the partially removed position.

In the preferred embodiment, the primary and secondary latches 18 and 22 are oriented so each of the two secondary latches is mounted on a sidewall 30 or 32 of the battery pack 12 and the primary latch is on the front sidewall 20, which is substantially perpendicular to the left and right sidewalls. This orientation requires the user to reposition his or her hand after disengaging the primary latch 18 before the user can disengage the secondary latches and remove the battery pack 12 from the handle 14 of the scanner 16. Accordingly, the location and orientation of the primary and secondary latches, 18 and 22, prevents a user from quickly sliding the battery pack 12 out of the handle 14 and suddenly terminating the electrical connection between the scanner 16 and the battery pack.

Although the preferred embodiment uses only one primary latch 18 on the front sidewall 20 of the battery pack 12 and two secondary latches 22 on the left and right side portions 30 and 32 of the battery pack positioned away from the primary latch, the latching system 10 can incorporate other combinations of primary and secondary latches. For example, a primary latch could be provided on the back portion of the handle, alone or in combination with a front side primary latch. Alternatively, the secondary latches could be provided on the front and back sides of the battery pack and the primary latches connected to the left and right sides of the battery pack.

As best shown in FIG. 2, the battery pack 12 of the preferred embodiment has elongated electrically conductive strips 88 on the upper portion 24 that are electrically coupled to battery cells 90 with the battery pack. The strips 88 are adapted to engage electrical connectors within the handle interior chamber 13 when the battery pack is in any position between and including the fully installed position and the partially removed position. Accordingly, the blocking action of the secondary latches 22 enables the latching system 10 to act as a data storage safety system. For example, when the battery pack 12 is in the installed position and the primary latch 18 is engaged, the battery pack 12 is electrically connected to the electronic device 16. As the primary latch 18 is disengaged and moved away from the installed position, electrical connection is maintained and the switch 25 detects the battery pack movement and provides the signal to the electronic device to begin the orderly shut-down procedure, wherein data in the device's memory is properly saved. This orderly shut-down process requires only a short period of time, but if the battery pack 12 is removed too quickly, the process will not be complete and data can be lost. The time required for the user to release the primary latch 18, slide the battery pack 12 out of the handle 14 to the partially removed position, reorient his or her hand, and release the secondary latches 22 before fully removing the battery pack, is sufficient to allow the electronic device 16 to perform the orderly shut-down process.

The secondary latches 22 also provide a safety mechanism that prevents the battery pack from falling out of the housing interior chamber 13 and being damaged if the primary latch 18 is advertently or inadvertently released.

As such, the steps for removing the battery pack 12 involves moving the primary latch 18 from the engaged position to the released position and sliding the battery pack from the installed position to the partially removed position. When the battery pack 12 is moved out of the installed position, the switch 25 in the computer device is activated and the computer device begins the orderly shut-down process. The battery pack 12 will be stopped from moving beyond the partially removed position by the secondary latches 22 as they engage the secondary retaining shoulders 68. Thereafter, the user must reposition his or her hand to engage the secondary latches 22. The secondary latches 22 are then moved from the engaged position to the released position, and the battery pack 12 is pulled out of the handle 14, whereby electrical connection is terminated and the battery pack disengaged from the housing. In the preferred embodiment, the primary latch 18 is disengaged by depressing the button 66 of the flexible battery boot 48 identifying the location of the primary release portion 64 therebelow, and the secondary latches 22 are disengaged by depressing the buttons of the secondary release portion 84, thereby moving the latches to the released position by overcoming the outward biasing force exerted by the lever arms 70.

Once the battery pack 12 is removed from the housing, the battery pack can be recharged for reinsertion or another charged battery pack having the latching system 10 of the present invention can be inserted into the handle and slid into the fully installed position, thereby again providing power to the electronic device 16.

Numerous modifications and variations of the primary and secondary latching system for the removable and portable battery pack disclosed herein will occur to those skilled in the art in view of this disclosure. For example, the primary and secondary latches could be attached to the handle mechanism and the retaining shoulder portions formed in the battery pack, thereby forming an inverted latching system from that discussed above. Therefore, it is to be understood that the modifications and variations and equivalents thereof may be practiced while remaining within the spirit and the scope of the invention as defined by the following claims.

We claim:

1. A removable battery pack assembly for use with a portable electronic device having a housing that removably receives at least a portion of the battery pack assembly within a housing interior chamber, the housing having detents in the housing interior chamber, the housing being adapted to electrically contact the battery pack to receive electrical power from said battery pack, the electronic device further having a switch mechanism that detects movement of the battery pack assembly away from a known position, the battery pack assembly comprising:

a battery case with at least one battery held therewithin, said battery case being adapted to at least partially fit within the housing interior chamber;

a primary securing member connected to a first portion of said battery case, said primary securing member being adapted to releasably engage a first detent in the housing interior chamber to releasably secure said battery case within the housing interior chamber in an installed position;

a secondary securing member connected to a second portion of said battery case, said secondary securing member being adapted to releasably engage a second detent in the housing interior chamber to releasably secure said battery case within the housing interior chamber in a partially removed position;

electrical contacts connected to said battery case and adapted to maintain electrical contact with the electronic device when said battery case moves between said installed position and said partially removed position; and activation means connected to said battery pack to activate the switch mechanism in the electronic device to provide an indication to the electronic device movement of said battery pack away from the known position.

2. The removable battery pack assembly of claim 1 wherein said primary securing member includes a primary latch, and said secondary securing member includes a secondary latch.

3. The removable battery pack assembly of claim 2 wherein said primary latch is adapted to move between a first engaged position and a first released position, and said secondary latch is adapted to move between a second engaged position and a second released position.

4. The removable battery pack of claim 3 wherein said first portion is a front sidewall of said battery case, and said second portion is a left or right sidewall of said battery case.

5. The removable battery pack of claim 3 wherein said primary latch is biased toward said first engaged position, and said secondary latch is biased toward said second engaged position.

6. The removable battery pack assembly of claim 1 wherein said primary securing member is a first latch movably connected to a front portion of the battery case, and said secondary securing member includes a second latch movably connected to a first side portion of said battery case, and a third latch is movably connected to a second side portion of said battery case.

7. The removable battery pack assembly of claim 1 wherein said secondary securing member is positioned so as to be inaccessible to a user when said battery pack is in said installed position.

8. The removable battery pack assembly of claim 7 wherein said primary latch has a first flexible lever arm connected to said battery casing and a first head portion that releasably engages the first detent and said secondary latch has a second flexible lever arm connected to said battery case and a second head portion that releasably engages the second detent.

9. The removable battery pack assembly of claim 8 wherein said secondary latch is completely disposed within the housing interior chamber and inaccessible to a user when said battery casing is in said installed position.

10. The removable battery pack assembly of claim 1, further comprising a primary release device coupled to said primary securing member and adapted to move said primary securing member from a first engaged position with said primary securing member engaging the first detent to a first released position with said secondary securing member released from the first detent, and a secondary release device coupled to said secondary securing member and adapted to move said secondary securing member from a second engaged position with said secondary securing member engaging the second portion of the housing to a second released position with said secondary securing member released from the second detent.

11. A latching assembly for a removable power supply for use with a portable electronic device having a housing with first and second detents therein, the housing being adapted to receive at least a portion of the removable power supply within a housing interior chamber, the latching assembly comprising:
a primary securing member connected to a first portion of the power supply and adapted to releasably engage the first detent to removably secure the power supply at least partially within the housing interior chamber in an installed position, said primary securing member being adapted to move between a first engaged position with said primary securing member releasably engaging the first detent and a first released position with said primary securing member released from the first detent;
a primary release device coupled to said first securing member and adapted to move said primary securing member from said first engaged position to said first released position;
a secondary securing member connected to a second portion of the power supply and adapted to releasably engage the second detent to removably secure the power supply in a partially removed position, said secondary securing member being adapted to move between a second engaged position with said secondary securing member releasably engaging the second detent and a second released position with said secondary securing member released from the second detent; and
a secondary release device coupled to said second securing member and adapted to move said secondary securing member between said second engaged position and said second released position.

12. The latching assembly of claim 11 wherein said primary securing member includes a first latch and said secondary securing member includes a second latch.

13. The latching assembly of claim 12 wherein said first latch has a first vertically oriented lever arm and a first head member, said first latch being biased toward said first engaged position, and said second latch has a second vertically oriented lever arm and a second head member, said second latch being biased toward said second engaged position.

14. The latching assembly of claim 11 wherein said secondary securing member and said secondary release device are inaccessible to a user when said primary securing member engages the first detent.

15. The latching assembly of claim 11 wherein said first latch is movably connected to a front area of the power supply, and said second latch is movably connected to a side portion of the power supply.

16. A battery pack and switch assembly for use with a portable electronic device having a plurality of internal components and a housing that removably receives at least a portion of the battery pack and switch assembly within a housing interior chamber, the housing having first and second engagement portions in the housing interior chamber, the housing being adapted to electrically contact the battery pack to receive electrical signals and electrical power from said battery pack, the battery pack assembly comprising:
a battery case with at least one battery held therewithin, said battery case being adapted to at least partially fit within the housing interior chamber;
a primary securing member connected to a first portion of said battery case, said primary securing member being adapted to releasably engage the first engagement portion to releasably secure said battery case within the housing interior chamber in an installed position;
a secondary securing member connected to a second portion of said battery case, said secondary securing member being adapted to releasably engage the second engagement portion to releasably secure said battery case within the housing interior chamber in a partially removed position;

electrical contacts connected to said battery case and adapted to maintain electrical contact with the electronic device when said battery case moves between said installed position and said partially removed position; and a switch device coupled to said battery case that is adapted to provide an electrical signal to the electronic devise.

17. The battery pack and switch assembly of claim 16 wherein said primary securing member includes a primary latch and said secondary securing member includes a secondary latch.

18. The battery pack and switch assembly of claim 17 wherein said primary latch is adapted to move between a first engaged position and a first released position and said secondary latch is adapted to move between a second engaged position and a second released position.

19. The battery pack and switch assembly of claim 18 wherein said primary latch is biased toward said first engaged position and said secondary latch is biased toward said second engaged position.

20. The battery pack and switch assembly of claim 17 wherein said switch device is a sensing device coupled to the electronic device that senses movement of said battery case away from said installed position.

21. The battery pack and switch assembly of claim 17 wherein said switch device is a sensing device coupled to said primary securing member to sense movement of said primary securing device from said first engaged position toward said first released position.

22. The battery pack and switch assembly of claim 17 wherein said primary latch is completely disposed with the housing interior chamber and inaccessible to a user when said primary latch releasably secures said battery casing in said installed position.

23. A method of removing a removable battery pack assembly that is installed in a housing of a hand held electronic device to assure electronic connection between the battery pack assembly and the electronic device is maintained until data in the electronic device is stored, the battery pack assembly having primary and secondary latching devices that engage detents in the housing, the secondary latching devices being inaccessible when the primary latching device engages at least one of the detents, comprising the steps of:

moving the primary latching device from an engaged position to a released position with primary latching device disengaged from at least one of the detents;

moving the battery pack from a first inserted position to a second partially removed position whereat the battery pack is blocked from moving beyond the second position by the secondary latching device, while maintaining the electrical connection between the battery pack and the hand held electronic device as the battery pack moves between the first and second positions;

moving the secondary latching devices from an engaged position to a released position with the secondary latching device disengaged from the housing; and after moving the secondary latching device to the released portion, sliding the battery pack out of the housing to terminate the electrical connection therewith and disengage the battery pack from the housing.

24. The method of claim 23 wherein the step of moving the primary latching device comprises depressing a primary release device attached to the primary latching devise and moving the primary latching device from an engaged position to released position, and the step of moving the secondary release devise comprises depressing secondary release device attached to the secondary latching devices from a second engaged position to a second released position.

25. The method of claim 23 further comprising the step of detecting movement of the battery pack away from the inserted position and providing an indication of the movement to the electronic device.

26. The method of claim 23, further comprising the step of providing access to the secondary latching device by moving the battery pack toward said second position.

27. A method of replacing a removable battery pack assembly that is installed in a housing of a hand held electronic device to assure electronic connection between the battery pack assembly and the electronic device is maintained until data in the electronic device is stored, the battery pack assembly having a primary latch and two secondary latches that engage detents in the housing, the secondary latches being inaccessible when the primary latch engages at least one of the detents, comprising the steps of:

disengaging the first latch from at least one detent wherein the first latch is disposed on a front portion of the battery pack;

sliding the battery pack from a first inserted position with the battery pack fully installed in the electronic device and in electrical connection with the electronic device to a second partially removed position with the battery pack partially removed from the electronic device and in electrical connection with the electronic device whereat the battery pack is blocked from sliding past the second position by the secondary latches;

disengaging the secondary latches from the detents wherein the second latches are positioned on the battery pack assembly away from the primary latch; terminating the electrical connection between the battery pack and electrical device;

sliding the battery pack out of engagement with the housing;

inserting a second battery pack into the housing interior chamber;

sliding the second battery pack past the partially removed position to the first position whereat the battery pack is fully installed in the electronic device; and securing the battery pack in the first position.

28. The method of claim 27, further comprising the step of detecting the movement of the battery pack away from the first position and providing an indication of the movement to the electronic device.

* * * * *

UNITED STATES PATENT AND TRADEMARK OFFICE
CERTIFICATE OF CORRECTION

PATENT NO. : 5,401,592
DATED : March 28, 1995
INVENTOR(S) : David Gilpin

It is certified that error appears in the above-indentified patent and that said Letters Patent is hereby corrected as shown below:

In column 9, claim 8, line 34, please delete "claim 7" and subsitute therefor --claim 2--.

In column 11, claim 16, line 8, please delete "devise" and subsitute therefor --device--.

In column 12, claim 24, line 9, please delete "devise" and subsitute therefor --device--.

In column 12, claim 24, line 11, please delete "devise" and subsitute therefor --device--.

Signed and Sealed this

Fifth Day of September, 1995

*Attest:*

BRUCE LEHMAN

*Attesting Officer*  *Commissioner of Patents and Trademarks*